F. KANKE, Jr.
CULTIVATOR.
APPLICATION FILED MAY 18, 1921.
1,431,815.
Patented Oct. 10, 1922.
2 SHEETS—SHEET 1.
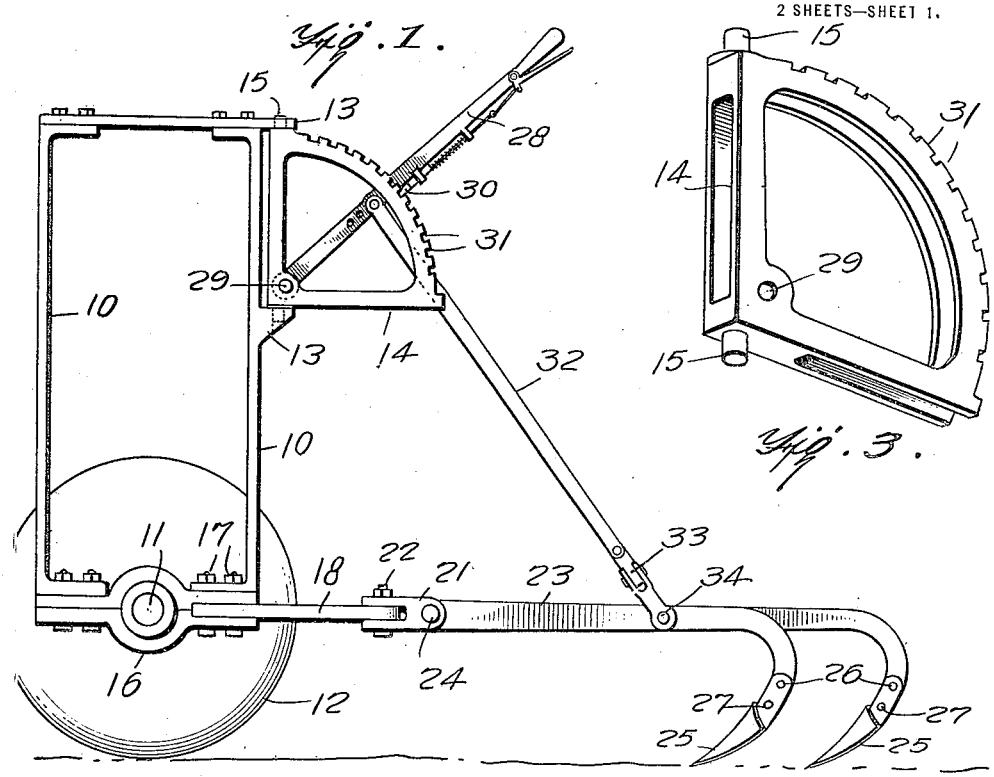
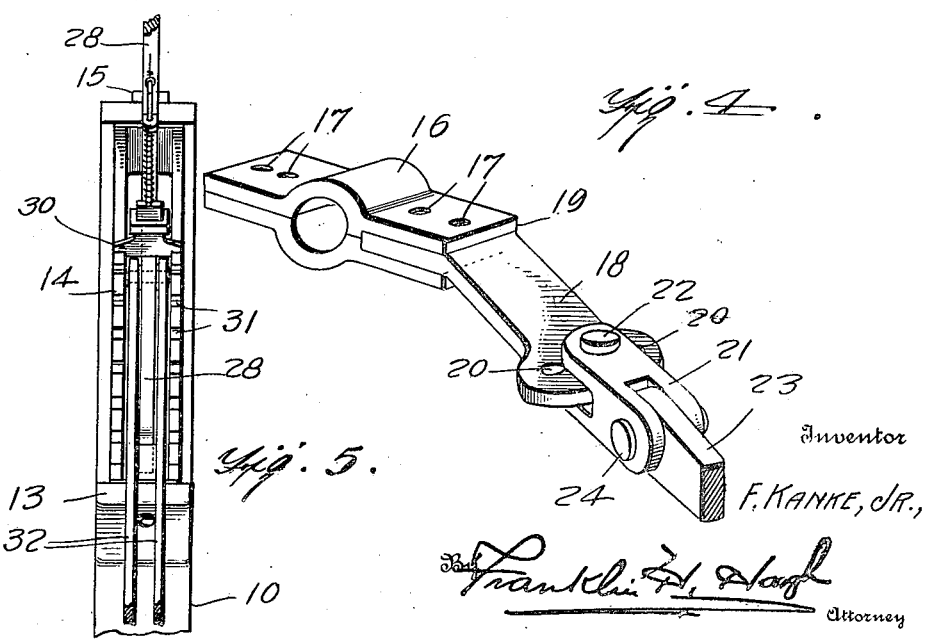

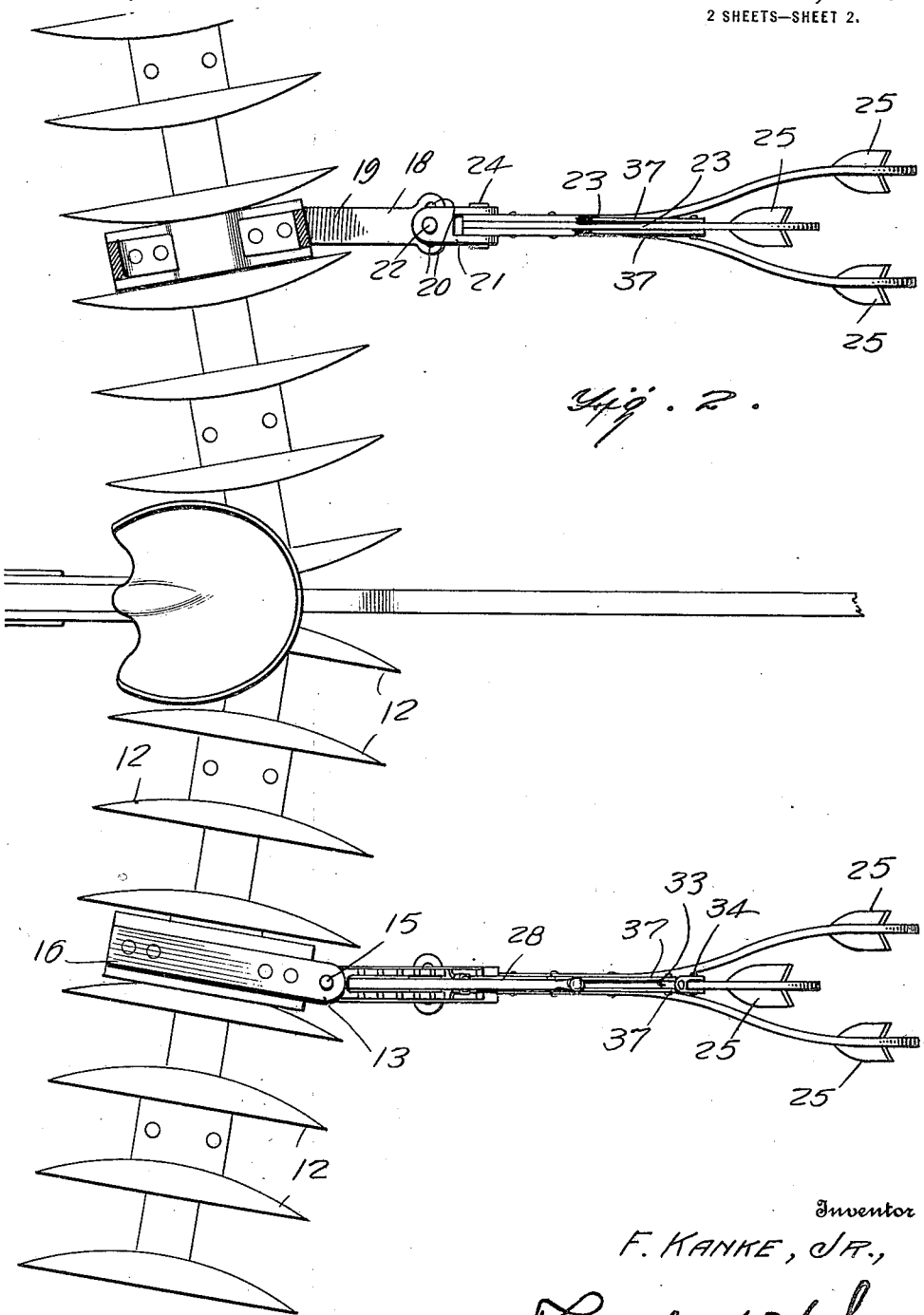

Patented Oct. 10, 1922.

1,431,815

UNITED STATES PATENT OFFICE.

FRED KANKE, JR., OF VAN HORN, IOWA.

CULTIVATOR.

Application filed May 18, 1921. Serial No. 470,629.

*To all whom it may concern:*

Be it known that I, FRED KANKE, Jr., a citizen of the United States, residing at Van Horn, in the county of Benton and State of Iowa, have invented certain new and useful Improvements in Cultivators, of which the following is a specification, reference being had therein to the accompanying drawings.

This invention relates to cultivators and has for an object to provide an improved type of cultivator to be attached to a disc harrow to cultivate a plurality of rows in the rear of the discing.

A further object of the invention is to provide a plurality of members to engage about the axle of the units of a disc harrow with cultivating shovels attached thereto and extending rearwardly thereof, and means for raising and lowering the shovels independently of the action of the disc structure.

With these and other objects in view the invention comprises certain novel units, elements, parts, mechanical movements, combinations and functions as will be hereinafter more fully described and claimed.

In the drawing:

Figure 1 is a sectional view of the invention taken transversely through the axle of a conventional disc harrow showing the cultivator attached thereto.

Figure 2 is a top plan view of a conventional disc harrow with two cultivators attached thereto, some parts being broken away to disclose the structure.

Figure 3 is a perspective view of one of the quadrants.

Figure 4 is a perspective view of one of the members for attaching the device to a disc harrow.

Figure 5 is a view in rear elevation of one of the segments and connected parts.

Disc harrows are provided ordinarily with upstanding framework which may be indicated as 10 at Figure 1 to which and in which the axle 11 is journaled carrying the usual plurality of discs 12. Appropriate members of the framework 10 are provided with ears 13 and a quadrant 14 is connected with said ears as by the studs 15 so that the said quadrant may swivel about on said studs which are aligned.

About the axle 11 a clip 16 is provided, secured thereon in any approved manner as by bolting at 17 and provided also with a rigid arm 18 which extends rearwardly with a bend at 19 to compensate for the angular position of the battery of discs so that the arm 18 will extend substantially parallel with the line of travel. The arm 18 is provided with a plurality of perforations 20 and a clip 21 is pivoted in either of said perforations 20 adjustably by means of a pivot pin 22.

To the clip 21 is also pivoted the compound beam 23 by means of a pivot pin 24. The beam 23 is branched to any approved number, shown in the drawings as three, but it is to be understood that this exact number is immaterial. At the end of the beam units, shovels 25 are carried in the usual manner by pivoting to the beam at 26 and providing brake pins 27.

To the segment 14 a manual lever 28 is pivoted at 29 having the usual detent 30 for engaging the ratchet teeth 31 of the quadrant. From the manual lever 29 bars 32 extend downwardly to a knuckle 33 pivoted at 34 to the compound beam, preferably, though not necessarily, by engaging the middle unit of said beam.

It will be obvious that by attaching the device to a disc harrow as indicated the several cultivators, two of which are shown particularly at Figure 3, will trail in the rear of said disc harrow, substantially parallel with the line of travel of the implement and that it may be employed in any usual and ordinary manner for any usual and ordinary purpose.

It will also be obvious that by manipulating the lever 28 the shovels may be raised from and lowered into operative position so that they may be employed or not as exigencies of use may make desirable. The provision of the pivots upon the studs 15 and 22, while not exactly in alignment, is such as to permit sufficient flexibility of the device for responding to turning or angular movement of the implement as an entirety without breakage.

What I claim is:

1. The combination with a disc harrow embodying a plurality of spaced discs and an axle therefor of a member embracing the axle and extending in the rear of said discs, a beam pivoted to the said member adapted to move in any direction, and a manual lever secured to the disc structure adapted to raise and lower the beam.

2. The combination with a disc harrow embodying a plurality of spaced discs and an axle therefor mounted at an inclination to the line of travel of a member embracing the axle and extending rearwardly thereof and provided with a bend, a beam pivoted to the member upon compound pivots providing for fulcruming both in a horizontal and a vertical plane, and a manual lever carried by the disc structure adapted to raise and lower the beam upon the member.

3. The combination with a disc harrow embodying spaced discs and an axle inclined to the line of travel, a member secured to the axle and extending rearwardly of the disc and provided with a bend, a beam pivoted to the member adapted to swing in a horizontal and a vertical plane, a quadrant pivotally connected with the harrow structure, a manual lever pivotally connected with the quadrant, and links connecting the manual lever with the beam.

4. The combination with a disk harrow having a series of disks disposed at axial angles to each other, of a bearing carried by one of the series of disks and extending perpendicularly to the axis and continued by a rigid extension at an angle to the axis and substantially parallel with the line of travel of the harrow, a segment pivoted to swing in a horizontal plane relative to the bearing, a beam pivoted to the extension adapted to swing universally at a lever mounted for co-action with the segment; and a link connecting the lever with the beam.

In testimony whereof I hereunto affix my signature in presence of two witnesses.

FRED KANKE, Jr.

Witnesses:
 GLENN FITZGERALD,
 P. P. HOLLER.